(12) United States Patent
Gabriel et al.

(10) Patent No.: US 7,970,659 B2
(45) Date of Patent: Jun. 28, 2011

(54) METHOD AND COMPUTER READABLE MEDIUM FOR PROVIDING GIFT REGISTRY SERVICES THROUGH A GIFT REGISTRY NETWORK

(75) Inventors: Michael R. Gabriel, Foster City, CA (US); George Mount, Palo Alto, CA (US); Dante Cassanego, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 138 days.

(21) Appl. No.: 12/107,572

(22) Filed: Apr. 22, 2008

(65) Prior Publication Data

US 2009/0265253 A1 Oct. 22, 2009

(51) Int. Cl.
*G06Q 30/00* (2006.01)
(52) U.S. Cl. ............. 705/26.1; 705/26.8; 705/27.1
(58) Field of Classification Search .......... 705/26, 705/27
See application file for complete search history.

(56) References Cited

U.S. PATENT DOCUMENTS

| | | | | |
|---|---|---|---|---|
| 6,029,141 A * | 2/2000 | Bezos et al. | | 705/27 |
| 6,556,975 B1 * | 4/2003 | Wittsche | | 705/26 |
| 2001/0032170 A1 * | 10/2001 | Sheth | | 705/37 |
| 2004/0073474 A1 * | 4/2004 | Field et al. | | 705/10 |
| 2004/0153352 A1 * | 8/2004 | Berns et al. | | 705/8 |
| 2005/0033650 A1 * | 2/2005 | Robertson | | 705/26 |
| 2009/0171808 A1 * | 7/2009 | Tracey | | 705/26 |

OTHER PUBLICATIONS

NetGift Registry Network New Multi-Site Gift Registry Network—Business Editors—Business Wire New York Nov. 2, 1999 p. 1.*
Making a List, Clicking it Twice—Leslie Walker—Washington Post—Washington DC Nov. 11, 1999.*

* cited by examiner

*Primary Examiner* — Jeffrey A Smith
*Assistant Examiner* — Courtney Stopp
(74) *Attorney, Agent, or Firm* — Park, Vaughan, Fleming & Dowler LLP; Chia-Hsin Suen

(57) ABSTRACT

Some embodiments of the present invention provide a system that provides gift registry services to a user. During operation, the system enrolls a business with a registry system and identifies a first set of items offered for sale by the business. Next, the system populates the registry system with the first set of items. Finally, the system presents the first set of items to the user for inclusion in a gift registry associated with the user.

10 Claims, 4 Drawing Sheets

202
Business Data

204
Business Name

206
Business Location

208
Contact Information

210
Business Hours

212
Business Description

FIG. 2

METHOD AND COMPUTER READABLE MEDIUM FOR PROVIDING GIFT REGISTRY SERVICES THROUGH A GIFT REGISTRY NETWORK

RELATED APPLICATION

The subject matter of this application is related to the subject matter in a co-pending non-provisional application by the inventors Mike Gabriel and George Mount and filed on the same day as the instant application entitled, "METHOD AND SYSTEM FOR ENTERING ITEMS INTO A GIFT REGISTRY," having serial number TO BE ASSIGNED, and filed 22 Apr. 2008.

BACKGROUND

Related Art

The present invention relates to techniques for providing gift registry services to a user through a gift registry network.

Gifts are often given for occasions such as weddings, baby showers, holidays, birthdays, and/or ceremonies. In addition, gift registries are typically offered by merchants to provide a convenient way to manage the purchasing of gifts for a specific recipient of the gifts. To use a gift registry, the recipient may add a list of desired items from the merchant to the gift registry and then provide the gift registry to buyers of the gifts, such as friends, family, or associates. The buyers may then select items to purchase by viewing the gift registry. When an item is purchased by a buyer, the item is removed from the gift registry, thus preventing the item from being purchased for the recipient multiple times.

However, standard gift registry services may have a number of drawbacks. First, the selection of items offered in a particular gift registry may be limited by the merchant offering the gift registry services. In other words, a gift registry from a particular merchant may only include items offered by the merchant. Furthermore, users may have difficulty finding and adding items to the gift registry. In particular, a user may browse available items and enter the items into his/her gift registry by navigating through a web-based interface provided by the merchant. However, the user may also wish to physically view the items by visiting one or more locations of the merchant. As a result, the user may be required to both manually maintain a list of items he/she is interested in while visiting a location of the merchant and subsequently add the list of items to the gift registry by entering details of the items into the web-based interface. Hence, potential gift registry users may be deterred by a limited selection of items offered for inclusion in gift registries and inconveniences associated with adding items to the gift registries.

SUMMARY

Some embodiments of the present invention provide a system that provides gift registry services to a user. During operation, the system enrolls a business with a registry system and identifies a first set of items offered for sale by the business. Next, the system populates the registry system with the first set of items. Finally, the system presents the first set of items to the user for inclusion in a gift registry associated with the user.

In some embodiments, the system also enrolls a partner business of the business with the registry system and identifies a second set of items offered for sale by the partner business. Next, the system adds the second set of items to the registry system. Finally, the system presents the second set of items to the user for inclusion in the gift registry.

In some embodiments, the partner business is referred to the registry system by the business.

In some embodiments, the first set of items is identified by receiving an inventory list from the business or by receiving a manually entered identifier for an item from the set of items through a user interface with the business.

In some embodiments, the inventory list is customized by the business to include at least one of a product image, a product description, a product review, and a product availability.

In some embodiments, an item from the first set of items is not presented to the user if the system receives a notification of a lack of availability of the item from the business.

In some embodiments, enrolling the business involves obtaining at least one of a business name, a business location, contact information, business hours, and a business description from the business.

BRIEF DESCRIPTION OF THE FIGURES

FIG. 2 shows business data for a business in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments of the invention provide a method and system for providing gift registry services to a user. More specifically, embodiments of the invention provide a method and system for providing gift registry services to the user through a gift registry network of businesses. The gift registry network may be created by enrolling the businesses with a registry system and identifying items offered for sale by the businesses. The items may then be presented to the user for inclusion in a gift registry associated with the user. In addition, items may be added to the user's gift registry by: using images of barcodes identifying the items, a user interface of the registry system, custom barcodes identifying the items, and/or an interface between the businesses and the registry system.

Figure 1:
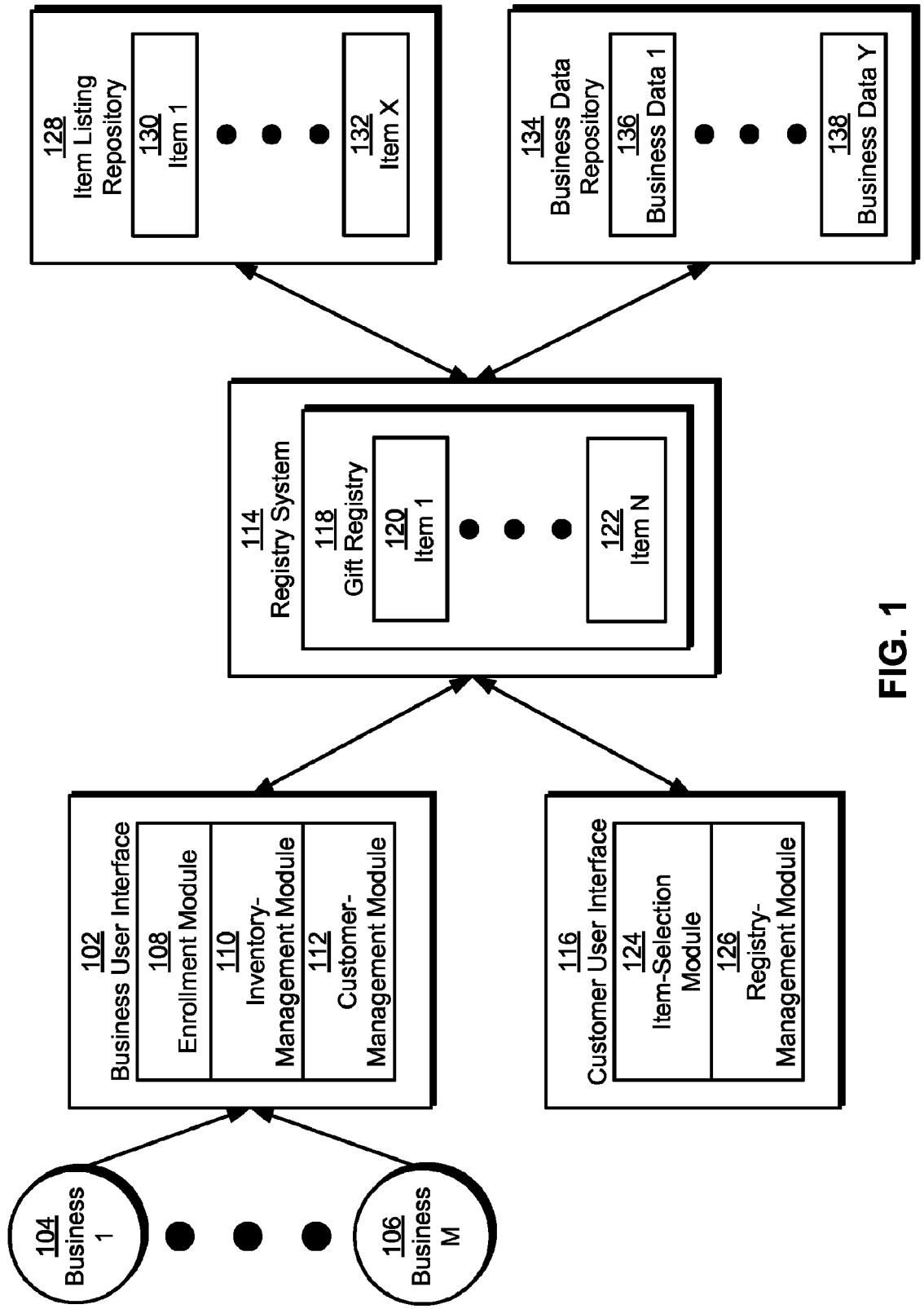
FIG. 1 shows a schematic of a system in accordance with an embodiment of the present invention.

FIG. 1 shows a schematic of a system in accordance with an embodiment of the present invention. In particular, FIG. 1 shows a system for providing gift registry services to a user through a gift registry network of businesses (e.g., business 1 104, business m 106) in accordance with an embodiment of the present invention. As shown in FIG. 1, the system includes a registry system 114, a business user interface 102, a customer user interface 116, an item listing repository 128, and a business data repository 134. Each of these components is described in further detail below.

Registry system 114 may provide gift registry services to a user. More specifically, registry system 114 may allow the user to create a gift registry 118 and manage a number of items (e.g., item 1 120, item n 122) using gift registry 118. Gift registry 118 may then be used to facilitate the purchasing of the items for the user by potential buyers of the items, such as friends, family, and/or other acquaintances of the user. For example, gift registry 118 may be created for a special occasion associated with the user, such as a wedding, baby shower, birthday, and/or holiday. Acquaintances of the user wishing to buy gifts for the user may view the items (e.g., item 1 120, item n 122) within gift registry 118 and purchase one or more items as gifts for the user. In addition, items purchased by the acquaintances may be removed from gift registry 118 to prevent the items from being redundantly purchased by multiple buyers.

In one or more embodiments of the invention, registry system 114 is implemented using a client-server architecture. More specifically, registry system 114 may be executed on one or more servers. In addition, registry system 114 may be accessed from other machines using a web browser and network connection. Alternatively, registry system 114 may be locally installed on a computing system, such as a personal computer (PC), mobile phone, personal digital assistant (PDA), and/or other digital computing device of the user.

To interact with the user and/or potential buyers of items within gift registry 118, registry system 114 may include a customer user interface 116 (e.g., graphical user interface (GUI), web-based user interface, etc.) that is accessed by the user and/or potential buyers. To use registry system 114, the user and/or potential buyers may navigate through one or more screens of user interface 116 and interact with user interface elements such as form fields, calendar widgets, radio buttons, menus, and/or checkboxes. For example, customer user interface 116 may allow the user to enroll with registry system 114, add and remove items from gift registry 118, add information about items, and/or provide a list of the items to potential buyers of the items. The potential buyers may also interact with customer user interface 116 to view the list of items in gift registry 118 and remove items that have been purchased.

In one or more embodiments of the invention, registry system 114 presents a set of items offered for sale by businesses (e.g., business 1 104, business m 106) enrolled in registry system 114 to the user for inclusion in gift registry 1 18. In other words, registry system 114 enables a gift registry network to be created among the businesses to facilitate creating and using gift registry 118 for a user and promoting items offered for sale by the businesses. To create the gift registry network, registry system 114 may interact with the businesses through business user interface 102. As with customer user interface 116, business user interface 102 may include one or more screens and one or more user interface elements that allow the businesses to use registry system 114.

In particular, an enrollment module 108 within business user interface 102 allows businesses to enroll in registry system 114. In one or more embodiments of the invention, enrollment of a business in registry system 114 involves creating an account for the business on registry system 114. Enrollment of the business may also involve obtaining business data (e.g., business data 1 136, business data y 138) associated with the business from the business, such as a business name, a business location, contact information, business hours, and/or a business description. Furthermore, the business data may be stored in business data repository 134 for future retrieval and presentation to the user and/or other businesses.

In one or more embodiments of the invention, businesses enrolled in registry system 114 include partner businesses. More specifically, registry system 114 may enroll a partner business by receiving a referral for the partner business from a business already enrolled in registry system 114. For example, a china shop may enroll in registry system 114 to offer chinaware on registry system 114 for inclusion in gift registry 118. The china shop may then refer a flatware shop to registry system 114 to allow the flatware shop to offer flatware on registry system 114 for inclusion in gift registry 118. In other words, registry system 114 may include mechanisms that allow partner businesses to encourage creation of the gift registry network and cross-promote each other's items using the gift registry network. As a result, the user may create gift registry 118 by browsing a diverse array of items from a variety of businesses enrolled in registry system 114.

To list items in registry system 114, the businesses may use an inventory-management module 110 within business user interface 102. In one or more embodiments of the invention, items (e.g., item 1 130, item x 132) offered for sale by the businesses are identified by registry system 114 and stored in item listing repository 128. In addition, the items may be identified by receiving inventory lists and/or manually entered identifiers for one or more items from the businesses through inventory-management module 110. For example, the businesses may upload their inventory lists to registry system 114 through inventory-management module 110. The inventory lists may further be customized by the businesses to include additional product information about the items, such as product images, product descriptions, product reviews, and/or product availabilities of the items. The businesses may also add items that are not included in their inventory lists by manually inputting identifiers for the items, such as the items' product codes, product names, product descriptions, and/or other product information into inventory-management module 110. Finally, the businesses may remove items from item listing repository 128 by sending a notification of a lack of availability of the items to registry system 114 and/or deleting the items using inventory-management module 110.

Once registry system 114 is populated with items from the businesses, the user may be presented with the items for inclusion in gift registry 118. The user may also select one or more items to add to gift registry 118. For example, the user may select one or more kitchen appliances listed by an appliance store, one or more sets of chinaware listed by a china shop, and/or one or more sets of flatware listed by a flatware shop for inclusion in gift registry 118. Registry system 114 may then add identifiers for the kitchen appliances, chinaware, and/or flatware to gift registry 118 upon receiving the item selections made by the user.

In one or more embodiments of the invention, registry system 114 includes a variety of mechanisms for receiving item selections by the user. In particular, selections of items for gift registry 118 may be made using images of barcodes identifying the items, an item-selection module 124 within customer user interface 116, custom barcodes identifying the items, and/or a customer-management module 112 within business user interface 102.

In one or more embodiments of the invention, registry system 114 allows the user to select items by capturing images of barcodes (e.g., Universal Product Codes (UPC) barcodes) identifying the items. Registry system 114 may then process the images to obtain product codes for the items from the barcodes and add the items to gift registry 118 using the product codes. The process of adding items into gift registries using image capture is described in a co-pending non-provisional application by inventors Mike Gabriel and George Mount and filed on the same day as the instant application entitled, "METHOD AND SYSTEM FOR ENTERING ITEMS INTO A GIFT REGISTRY," having serial number TO BE ASSIGNED, and filing date TO BE ASSIGNED, which is incorporated herein by reference.

In addition, item-selection module 124 may allow manual entry of items into gift registry 118 by the user. For example, item-selection module 124 may include form fields that prompt the user for product information related to an item, such as a product name, a product description, a product image, a product price, a product availability, and/or a product review. If an item (e.g., item 1 130, item x 132) in item listing repository 128 matches the product information, the user may add the item to gift registry 118. Item-selection module 124 may also allow the user to add items by browsing items in item listing repository 128 and/or viewing advertisements, sales, and/or special deals for the items offered by the businesses.

Custom barcodes identifying the items may also be utilized by the businesses to create a direct mapping between the items offered by the businesses and representations of the items in item listing repository 128. In other words, items offered through the gift registry network may be identified using custom barcodes recognized by registry system 114. Each individual item may additionally be enumerated using a specific custom barcode, thus allowing registry system 114 to keep track of item availabilities at each business. The items may then be added to gift registry 118 by capturing images of the custom barcodes and/or scanning the custom barcodes using barcode scanners provided by the businesses.

Items may also be added to gift registry 118 on the user's behalf by the businesses using customer-management module 112. For example, a business may send a selection of an item to registry system 114 on the user's behalf when the user is physically present at a location of the business and requests that the item be added to gift registry 118. More specifically, the businesses may enter one or more identifiers for the items into customer-management module 112 and send the identifiers to registry system 114. The identifiers may include barcodes (e.g., UPC, custom, etc.) for the items, product information for the items, and/or product codes for the items. Registry system 114 may then use the identifiers to retrieve items from item listing repository 128 and add the items to gift registry 118.

Once the items (e.g., item 1 120, item n 122) are added to gift registry 118, the items may be managed using a registry-management module 126 within customer user interface 116. For example, the user may use registry-management module 126 to view a listing of the items in gift registry 118, remove items from gift registry 118, add information about items, and/or provide a list of the items to potential buyers of the items. The potential buyers may also interact with registry-management module 126 to view the list of items in gift registry 118 and remove items that have been purchased. Furthermore, the user and/or potential buyers may receive notifications regarding changes to the items' availability, price, and/or other qualities that may influence the addition or removal of the items from gift registry 118 and/or the purchase of the items by the potential buyers.

Items in gift registry 118 may also include business data (e.g., business data 1 136, business data y 138) associated with the businesses offering the items. As discussed above, business data for each business may include a business name, a business location, contact information, business hours, and/or a business description. The business data may allow the user to manage items in gift registry 118 and may also help potential buyers locate and purchase the items for the user.

FIG. 2 shows business data for a business in accordance with an embodiment of the present invention. As mentioned previously, business data 202 may be used to enroll a business with a registry system, such as registry system 114 of FIG. 1. Business data 202 may also be included in a listing of an item in a gift registry to allow a user and potential buyers to manage the item within the gift registry. Furthermore, business data 202 may allow the user and/or potential buyers to choose between businesses offering similar or identical items. As shown in FIG. 2, business data 202 includes a business name 204, a business location 206, contact information 208 for the business, business hours 210 of the business, and a business description 212 of the business.

Business name 204 may serve as a unique identifier for the business within the community in which the business is located. In addition, business name 204 may be registered with a governmental agency as a part of the business's incorporation and/or Doing Business As (DBA) registration. As a result, the business may be recognized using business name 204, particularly if the business is located in the vicinity of the user and/or potential buyers.

Business location 206 corresponds to an address of the business. For example, business location 206 may include the business's street number, street name, city, state or province, postal code, and/or country. Business location 206 may also be represented using other means, such as Global Positioning System (GPS) coordinates. Furthermore, business location 206 may include multiple address and/or location listings if the business operates at multiple locations. Alternatively, the business may include a separate set of business data 202 for each location.

Contact information 208 may allow the user and/or potential buyers to contact the business. For example, contact information 208 may include the business's phone number, email address, and/or web address. Contact information 208 may also include the name of a representative of the business, such as the business's owner or manager. Moreover, a separate set of contact information 208 may be provided for each location of the business if business data 202 includes multiple business locations.

Business hours 210 may correspond to the business's hours of operation. In other words, business hours 210 may include the opening and closing times of the business for each day of the week, as well as special hours for holidays or events. As with contact information 208, a separate set of business hours 210 may be included in business data 202 for each business location 206 of the business.

Business description 212 may include a short synopsis of the products and/or services offered by the business. Business description 212 may also include other distinguishing features of the business, such as a business motto, business size, and/or business slogans.

Figure 3:
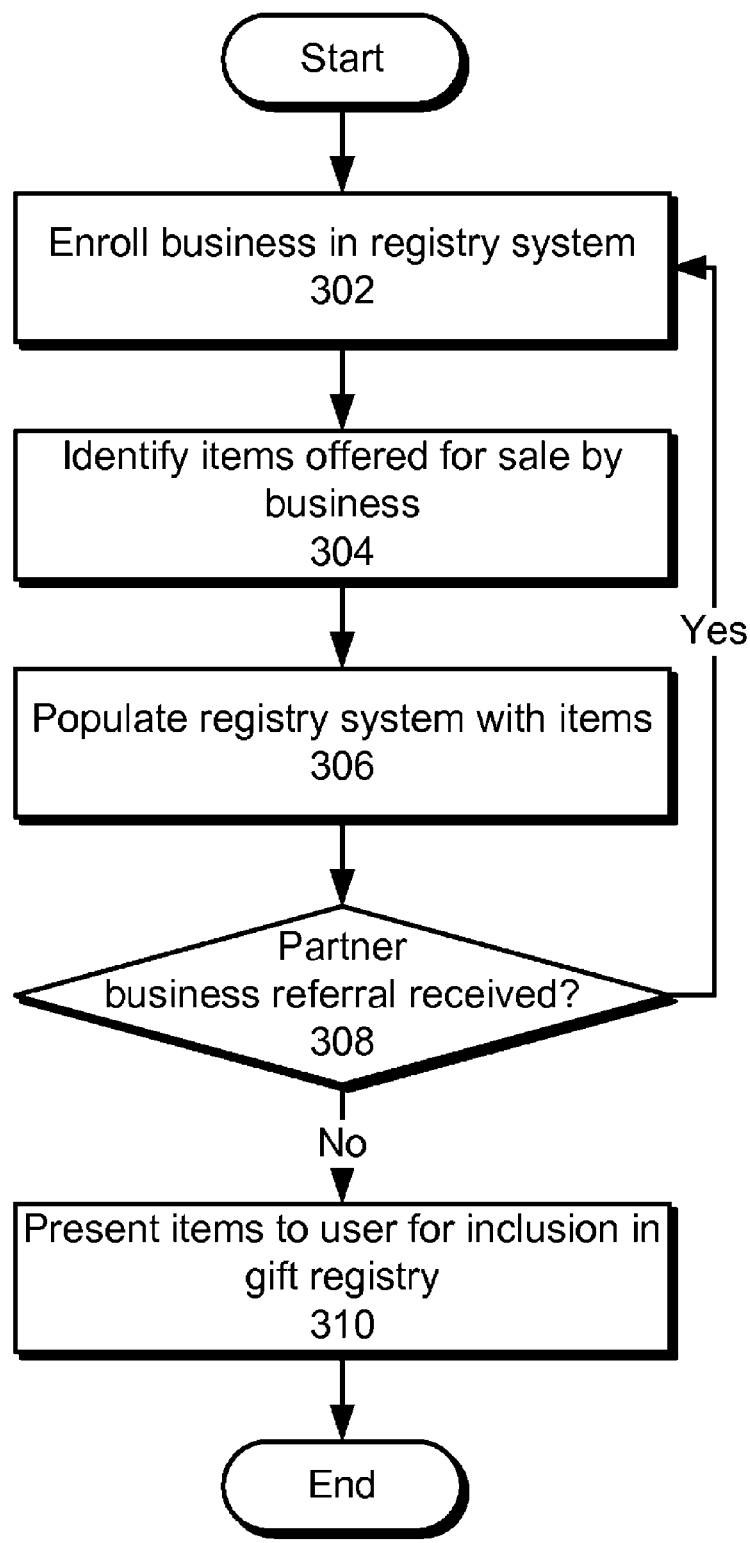
FIG. 3 shows a flowchart illustrating the process of creating a gift registry network in accordance with an embodiment of the present invention.

FIG. 3 shows a flowchart illustrating the process of creating a gift registry network in accordance with an embodiment of the present invention. In one or more embodiments of the invention, one or more of the steps may be omitted, repeated, and/or performed in a different order. Accordingly, the specific arrangement of steps shown in FIG. 3 should not be construed as limiting the scope of the invention.

Initially, a business is enrolled with a registry system (operation 302). The business may enroll by creating an account with the registry system and providing business data associated with the business, including a business name, a business location, contact information, business hours, and/or a business description. Next, a set of items offered for sale by the business is identified (operation 304). The items may be identified by receiving inventory lists and/or manually entered identifiers for one or more items from the business. In addition, the inventory lists may be customized by the business to include additional product information about the items, such as product images, product descriptions, product reviews, and/or product availabilities of the items.

The registry system is then populated with the items from the business (operation 306). To populate the registry system, the items may be added to an item listing repository of the registry system, such as item listing repository 128 of FIG. 1.

A referral for a partner business may also be received from the business (operation 308). As described above, the partner business may be referred to the registry system to cross-promote items offered by both businesses and to expand the gift registry network. If a referral for a partner business is received, the partner business is enrolled in the registry system (operation 302) by creating an account and obtaining business data associated with the partner business. Items offered for sale by the partner business are also identified (operation 304), and the registry system is populated with the items from the partner business (operation 306). The registry system may continue enrolling partner businesses and adding items from the partner businesses until no additional referrals for partner businesses are received. Alternatively, businesses may join the gift registry network by enrolling in the registry system without a referral and adding their items to the registry system.

Once enrollment of businesses is complete, the items are presented to a user of the registry system for inclusion in a gift registry associated with the user (operation 310). In addition, the items may be updated upon enrolling a new business in the registry system or receiving a notification of a lack of availability of an item from a business enrolled in the registry system.

Figure 4:
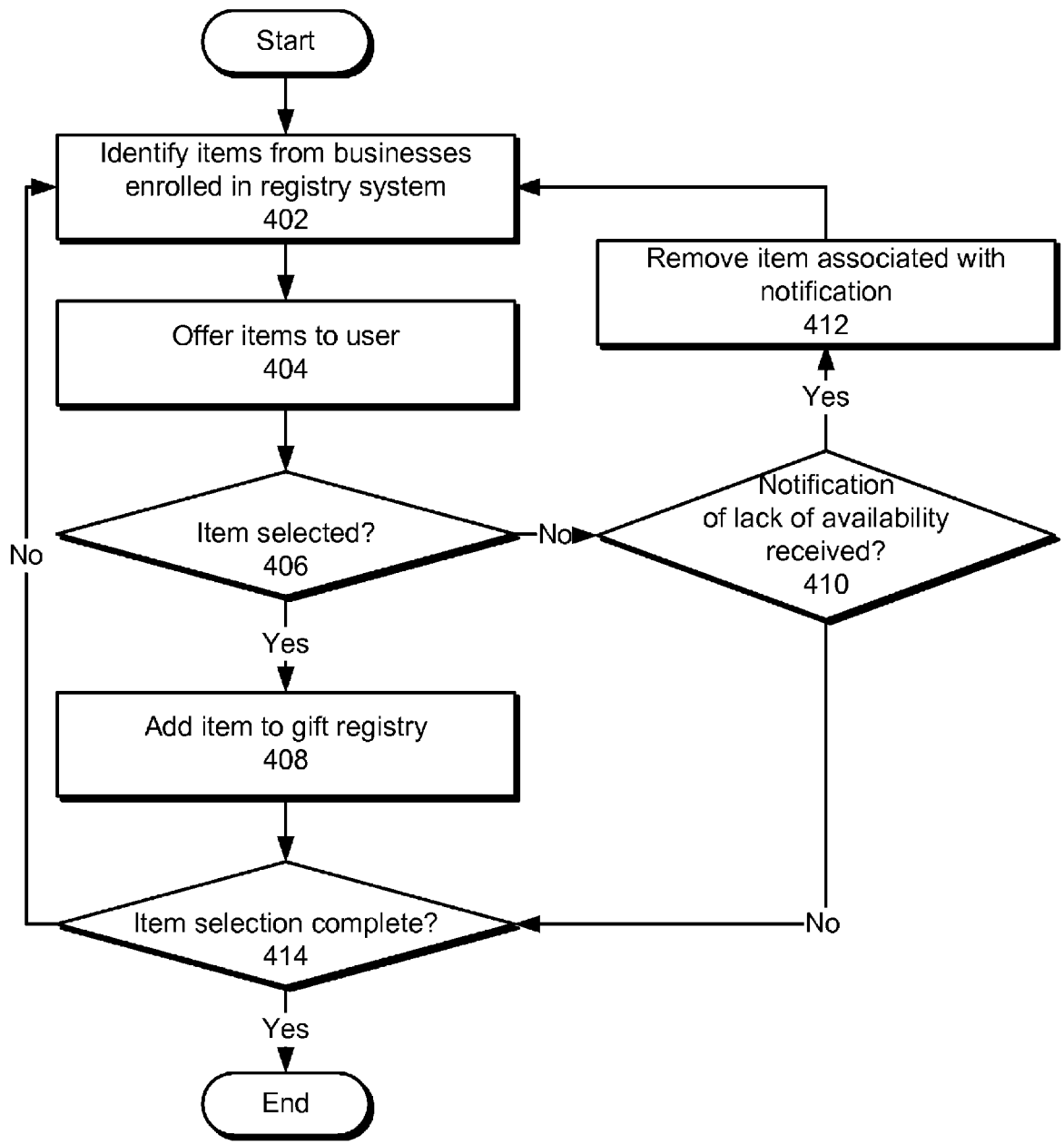
FIG. 4 shows a flowchart illustrating the process of creating a gift registry for a user in accordance with an embodiment of the present invention.

FIG. 4 shows a flowchart illustrating the process of creating a gift registry for a user in accordance with an embodiment of the present invention. In one or more embodiments of the invention, one or more of the steps may be omitted, repeated, and/or performed in a different order. Accordingly, the specific arrangement of steps shown in FIG. 4 should not be construed as limiting the scope of the invention.

First, a set of items from businesses which are enrolled in a registry system are identified (operation 402). The items are then offered to a user of the registry system (operation 404). For example, the items may be offered to the user at a physical location of a business enrolled in the registry system. Alternatively, representations of the items may be viewed using a customer user interface of the registry system, such as customer user interface 116 of FIG. 1.

The user may select an item for inclusion in the gift registry (operation 406). The item may be selected using an image of a barcode identifying the item, the customer user interface of the registry system, a custom barcode identifying the item, and/or an interface between the business offering the item and the registry system (e.g., business user interface 102 of FIG. 1). If the user has selected an item, the item is added to the gift registry (operation 408).

In addition, items may become unavailable as the items are offered to the user. In particular, a notification of lack of availability for an item may be received by a business offering the item (operation 410). For example, the business may run out of the item, or the item may be recalled by a manufacturer of the item. If a notification of lack of availability is received, the item associated with the notification is removed from the list of items offered to the user (operation 412).

Items from businesses enrolled in the registry system may continue to be identified (operation 402) and offered to the user (operation 404) for selection (operation 406) and addition to the gift registry (operation 408) until the user's item selection is complete (operation 414). Similarly, items may be removed (operation 412) if notifications of lack of availability are received (operation 410) from businesses offering the items. Once the user's item selection is complete and the gift registry is created, the gift registry may be used to manage the purchase of gifts for the user, as discussed above.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for providing gift registry services to a user, comprising:
presenting a first set of items from a gift registry system to the user for inclusion in a gift registry associated with the user, wherein the first set of items is associated with at least one business enrolled in the gift registry system;
receiving, from the business enrolled in the gift registry system, a referral for a partner business;
enrolling the partner business with the gift registry system in response to receiving the referral for the partner business, which involves:
identifying a second set of items offered for sale by the partner business; and
adding the second set of items to the gift registry system; and
in response to enrolling the partner business:
updating the items presented to the user to include the second set of items associated with the partner business; and
notifying the user of the availability of the second set of items.

2. The computer-implemented method of claim 1, wherein the second set of items is identified by:
   receiving an inventory list from the partner business; or
   receiving a manually entered identifier for an item from the set of items through a user interface with the partner business.

3. The computer-implemented method of claim 2, wherein the inventory list is customized by the partner business to include at least one of a product image, a product description, a product review, and a product availability.

4. The computer-implemented method of claim 1, wherein an item from the first set of items or the second set of items is not presented to the user upon receiving a notification of a lack of availability of the item from the business or the partner business.

5. The computer-implemented method of claim 1, wherein enrolling the partner business involves obtaining at least one of a business name, a business location, contact information, business hours, and a business description from the partner business.

6. A non-transitory computer-readable storage medium storing instructions that when executed by a computer cause the computer to perform a method for providing gift registry services to a user, the method comprising:
   presenting a first set of items from a gift registry system to the user for inclusion in a gift registry associated with the user, wherein the first set of items is associated with at least one business enrolled in the gift registry system;
   receiving, from the business enrolled in the gift registry system, a referral for a partner business;
   enrolling the partner business with the gift registry system in response to receiving the referral for the partner business, which involves:
      identifying a second set of items offered for sale by the partner business; and
      adding the second set of items to the gift registry system; and
   in response to enrolling the partner business:
      updating the items presented to the user to include the second set of items associated with the partner business; and
      notifying the user of the availability of the second set of items.

7. The non-transitory computer-readable storage medium of claim 6, wherein the second set of items is identified by:
   receiving an inventory list from the partner business; or
   receiving a manually entered identifier for an item from the set of items through a user interface with the partner business.

8. The non-transitory computer-readable storage medium of claim 7, wherein the inventory list is customized by the partner business to include at least one of a product image, a product description, a product review, and a product availability.

9. The non-transitory computer-readable storage medium of claim 6, wherein an item from the first set of items or the second set of items is not provided to the user upon receiving a notification of a lack of availability of the item from the business or the partner business.

10. The non-transitory computer-readable storage medium of claim 6, wherein enrolling the partner business involves obtaining at least one of a business name, a business location, contact information, business hours, and a business description from the partner business.

\* \* \* \* \*